United States Patent
Gukelberger et al.

(10) Patent No.: US 10,563,625 B2
(45) Date of Patent: Feb. 18, 2020

(54) INTERNAL COMBUSTION ENGINE HAVING DEDICATED EGR CYLINDER(S) AND START-STOP OPERATION

(71) Applicant: Southwest Research Institute, San Antonio, TX (US)

(72) Inventors: Raphael Gukelberger, Freudenstadt (DE); Garrett Anderson, Seguin, TX (US)

(73) Assignee: Southwest Research Institute, San Antonio, TX (US)

( * ) Notice: Subject to any disclaimer, the term of this patent is extended or adjusted under 35 U.S.C. 154(b) by 22 days.

(21) Appl. No.: 15/870,908

(22) Filed: Jan. 13, 2018

(65) Prior Publication Data

US 2019/0219006 A1   Jul. 18, 2019

(51) Int. Cl.
| | |
|---|---|
| B60W 10/06 | (2006.01) |
| F02M 26/43 | (2016.01) |
| F02M 26/06 | (2016.01) |
| F02M 26/46 | (2016.01) |
| F02N 11/08 | (2006.01) |
| F02D 41/00 | (2006.01) |
| F02D 41/14 | (2006.01) |
| F02M 26/00 | (2016.01) |
| F02D 41/06 | (2006.01) |
| F02N 99/00 | (2010.01) |

(52) U.S. Cl.
CPC ........... *F02M 26/43* (2016.02); *F02D 41/009* (2013.01); *F02D 41/1454* (2013.01); *F02M 26/06* (2016.02); *F02M 26/46* (2016.02); *F02N 11/0814* (2013.01); *F02D 41/062* (2013.01); *F02D 2041/0095* (2013.01); *F02M 2026/009* (2016.02); *F02N 99/006* (2013.01)

(58) Field of Classification Search
CPC .. F02D 41/062; F02D 41/009; F02D 41/1454; F02D 41/006; F02D 2041/0095; F02N 99/006; F02N 19/005; F02N 11/0814; F02M 26/43; F02M 26/06; F02M 26/46; F02M 26/466; F02M 2026/009
USPC .............. 701/108; 123/568.14, 90.12, 90.15, 123/198 F
See application file for complete search history.

(56) References Cited

U.S. PATENT DOCUMENTS

| | | | | |
|---|---|---|---|---|
| 9,481,356 | B2* | 11/2016 | Nakanishi | B60K 6/48 |
| 2004/0149247 | A1* | 8/2004 | Kataoka | F02N 11/006 |
| | | | | 123/179.4 |
| 2014/0360461 | A1* | 12/2014 | Ulrey | F02M 26/43 |
| | | | | 123/299 |

* cited by examiner

*Primary Examiner* — Hai H Huynh
*Assistant Examiner* — Gonzalo Laguarda
(74) *Attorney, Agent, or Firm* — Livingston Law Firm

(57) ABSTRACT

A method of implementing start-stop in an internal combustion engine, the engine having exhaust gas recirculation (EGR) from at least one dedicated EGR (D-EGR) cylinder. For stopping the engine, the camshaft is locked, and a hydraulic cam phaser is used to cushion the engine inertia. The engine is stopped such that one of the D-EGR cylinders is in top-dead center position. For starting the engine, that D-EGR cylinder is fuel-injected, and exhaust bleed-off performed if necessary.

9 Claims, 5 Drawing Sheets

INTERNAL COMBUSTION ENGINE HAVING DEDICATED EGR CYLINDER(S) AND START-STOP OPERATION

TECHNICAL FIELD OF THE INVENTION

This invention relates to internal combustion engines, and more particularly to such engines having one or more cylinders dedicated to production of recirculated exhaust, and which are operable with direct start.

BACKGROUND OF THE INVENTION

In an internal combustion engine system having dedicated EGR (exhaust gas recirculation), one or more cylinders of the engine are segregated and dedicated to operate in a rich combustion mode. Because of the rich combustion, the exhaust gases from the dedicated cylinder(s) have increased levels of hydrogen and carbon monoxide. Rich combustion products such as these are often termed "syngas" or "reformate".

Dedicated EGR engines use the reformate produced by the dedicated cylinder(s) in an exhaust gas recirculation (EGR) system. The hydrogen-rich reformate is ingested into the engine for subsequent combustion by the non-dedicated cylinders and optionally by the dedicated cylinder(s). The reformate is effective in increasing knock resistance and improving dilution tolerance and burn rate. This allows a higher compression ratio to be used with higher rates of EGR and reduced ignition energy, leading to higher efficiency and reduced fuel consumption.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to systems and methods for a vehicle, such as an automobile, having an engine with one or more dedicated EGR (D-EGR) cylinders. A D-EGR cylinder can operate at any equivalence ratio because, when its exhaust is recirculated, that exhaust will never exit the engine before passing through another cylinder operating at an air-fuel ratio for which the vehicle's exhaust aftertreatment system is designed. This allows the D-EGR cylinder to run rich, which produces hydrogen (H2) and carbon monoxide (CO) at levels that enhance combustion flame speeds, combustion, and knock tolerance of all the cylinders.

This description is further directed to engines that implement a "start-stop" engine control strategy. A start-stop engine automatically shuts down under certain conditions in which no engine drive power is being requested by the engine operator. When drive power is requested again, the engine is restarted. This reduces the amount of time that the engine spends idling, thereby reducing fuel consumption and emissions.

For start-stop engines, it is important to stop the engine without damaging the engine. The engine is stopped (or subsequently moved) such that at least one cylinder is at top-dead center (TDC), so that cylinder can be used to restart the engine.

For restarting a start-stop engine, "direct start" methods can be used. For a direct start, fuel is directly injected in a cylinder of the stopped engine, when that cylinder's piston is close to top-dead center (TDC). This maneuver starts the engine on its own by igniting the fuel.

As described below, a gasoline direct-injected D-EGR engine is uniquely suited for direct start operation. In such engines, direct start can be implemented by using a D-EGR cylinder as the direct-starting cylinder. In doing so, all emissions that are created during the initial direct-start cycle will not exit the tail pipe, but rather will be re-burned in non-D-EGR cylinders. As a result, even at very poor mixture preparation conditions, there will not be a negative impact on tail pipe emissions.

However, the following description describes methods and devices for stopping any stop-start engine, not limited to D-EGR engines.

Conventional Dedicated EGR Systems (Prior Art)

Figure 1:
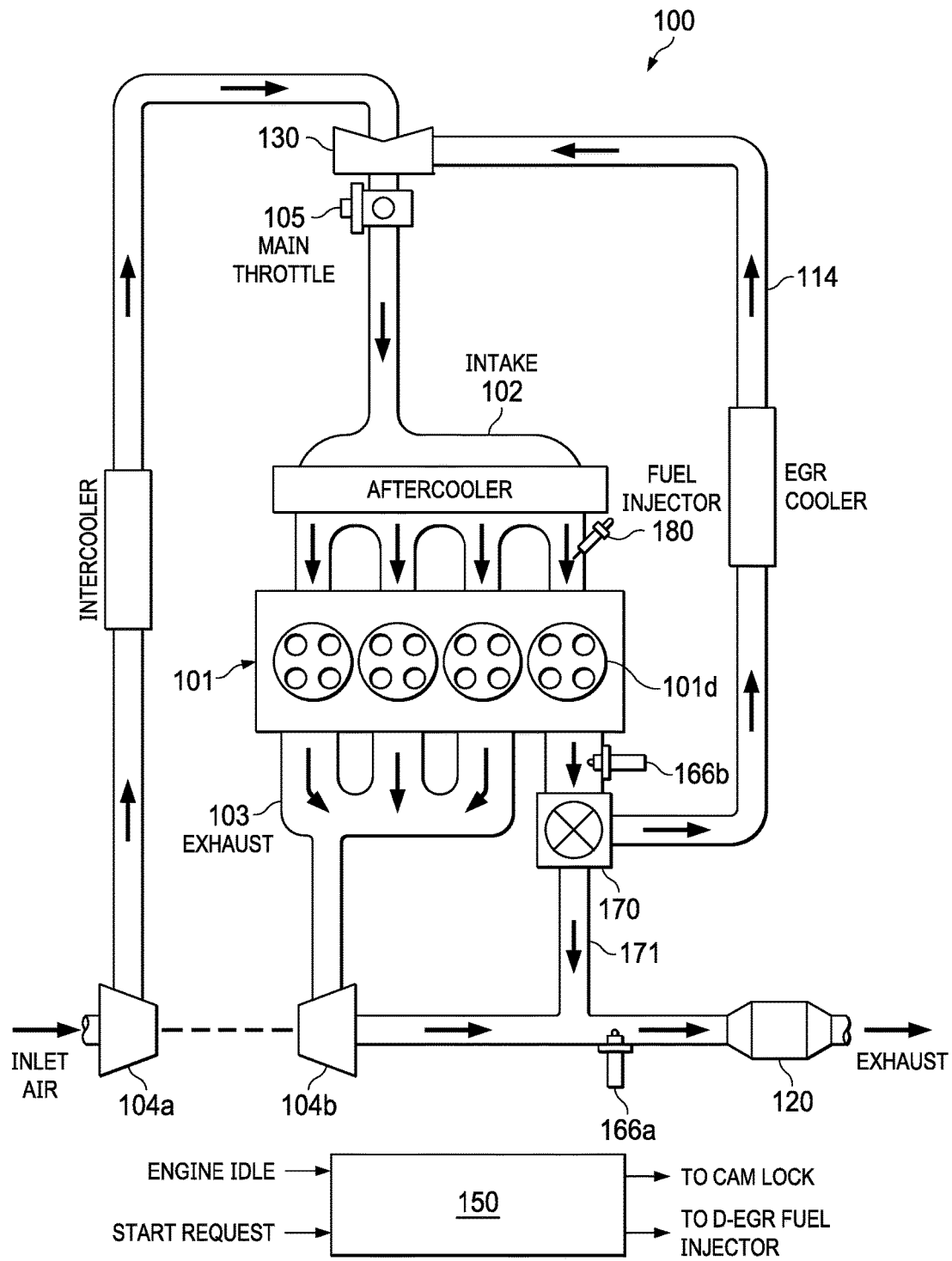
FIG. 1 illustrates a four-cylinder engine with one dedicated EGR cylinder, and a shared intake manifold.

FIG. 1 illustrates an internal combustion engine 100 having four cylinders 101. One of the cylinders is a dedicated EGR cylinder, and is identified as cylinder 101d. In the example of FIG. 1, engine 100 is gasoline-fueled and spark-ignited, with each cylinder 101 having an associated spark plug.

The dedicated EGR cylinder 101d may be operated at any desired air-fuel ratio. All of its exhaust may be recirculated back to the intake manifold 102.

In the embodiment of FIG. 1, the other three cylinders 101 (referred to herein as the "main" or "non dedicated" cylinders) are operated at a stoichiometric air-fuel ratio. Their exhaust is directed to an exhaust aftertreatment system via an exhaust manifold 103.

Engine 100 is equipped with a turbocharger, specifically a compressor 104a and a turbine 104b.

Although not explicitly shown, all cylinders 101 have a fuel delivery system for introducing fuel into the cylinders. For purposes of this description, the fuel delivery system is assumed to be consistent with gasoline direct injection, and each cylinder 101 is equipped with a fuel injector 180. It is assumed that the fuel injector timing, as well as the amount of fuel injected, for the main cylinders can be controlled independently of the fuel injector timing and fuel amount for the dedicated EGR cylinder(s).

In the example of this description, the EGR loop 114 joins the intake line downstream the compressor 104a. A mixer 130 mixes the fresh air intake with the EGR gas. A main throttle 105 is used to control the amount of intake (fresh air and EGR) into the intake manifold 102.

In the embodiment of this description, a three-way valve 170 controls the flow of dedicated EGR to the EGR loop or to the exhaust system. Valve 170 may be used to divert all or some of the EGR from the EGR loop 114 to a bypass line 171 that connects to the exhaust line, downstream the turbine 104b and upstream the three-way catalyst 120. Other configurations for controlling EGR flow are possible, such as an EGR valve just upstream of mixer 130.

The four-cylinder dedicated EGR system 100 with a single dedicated cylinder can provide a 25% EGR rate. In other dedicated EGR systems, there may be a different number of engine cylinders 101, and/or there may be more than one dedicated EGR cylinder 101*d*. In general, in a dedicated EGR engine configuration, the exhaust of a sub-group of cylinders can be routed back to the intake of all the cylinders, thereby providing EGR for all cylinders. In some embodiments, the EGR may be routed to only the main cylinders.

After entering the cylinders 101, the fresh-air/EGR mixture is ignited and combusts. After combustion, exhaust gas from each cylinder 101 flows through its exhaust port and into exhaust manifold 103. From the exhaust manifold 103, exhaust gas then flows through turbine 104*b*, which drives compressor 104*a*. After turbine 104*b*, exhaust gas flows out to a main exhaust line 119 to a three-way catalyst 120, to be treated before exiting to the atmosphere.

As stated above, the dedicated EGR cylinder 101*d* can operate at any equivalence ratio because its recirculated exhaust will not exit the engine before passing through a non-dedicated EGR cylinder 101 operating at a stoichiometric air-fuel ratio. Because only stoichiometric exhaust leaves the engine, the exhaust aftertreatment device 120 may be a three-way catalyst.

To control the air-fuel ratio, exhaust gas may be sampled by an exhaust gas oxygen (EGO) sensor. Both the main exhaust line 122 and the EGR loop 114 may have a sensor (identified as 166*a* and 166*b*), particularly because the dedicated EGR cylinder may be operated at a different air-fuel ratio than non-dedicated cylinders.

If a dedicated EGR cylinder is run rich of stoichiometric A/F ratio, a significant amount of hydrogen (H2) and carbon monoxide (CO) may be formed. In many engine control strategies, this enhanced EGR is used to increase EGR tolerance by increasing burn rates, increasing the dilution limits of the mixture and reducing quench distances. In addition, the engine may perform better at knock limited conditions, such as improving low speed peak torque results, due to increased EGR tolerance and the knock resistance provided by hydrogen (H2) and carbon monoxide (CO).

An EGR control unit 150 has appropriate hardware (processing and memory devices) and programming for controlling the EGR system. It may be incorporated with a larger more comprehensive control unit. Regardless of division of tasks, it is assumed there is control to receive data from any sensors described herein, and perform various EGR control algorithms. Control signals are generated for the various valves and other actuators of the EGR system. Fuel delivery is controlled such that the dedicated EGR cylinder may operate at an equivalence ratio greater than that of the main cylinders.

For purposes of the quick-start method described herein, control unit 150 is further programmed to receive data that represents when a quick start is being requested. In response, control unit 150 is programmed to deliver appropriate signals to devices described below that will act to stop the D-EGR cylinder at TDC and to inject fuel into the D-EGR cylinder to achieve the quick start.

Figure 2:
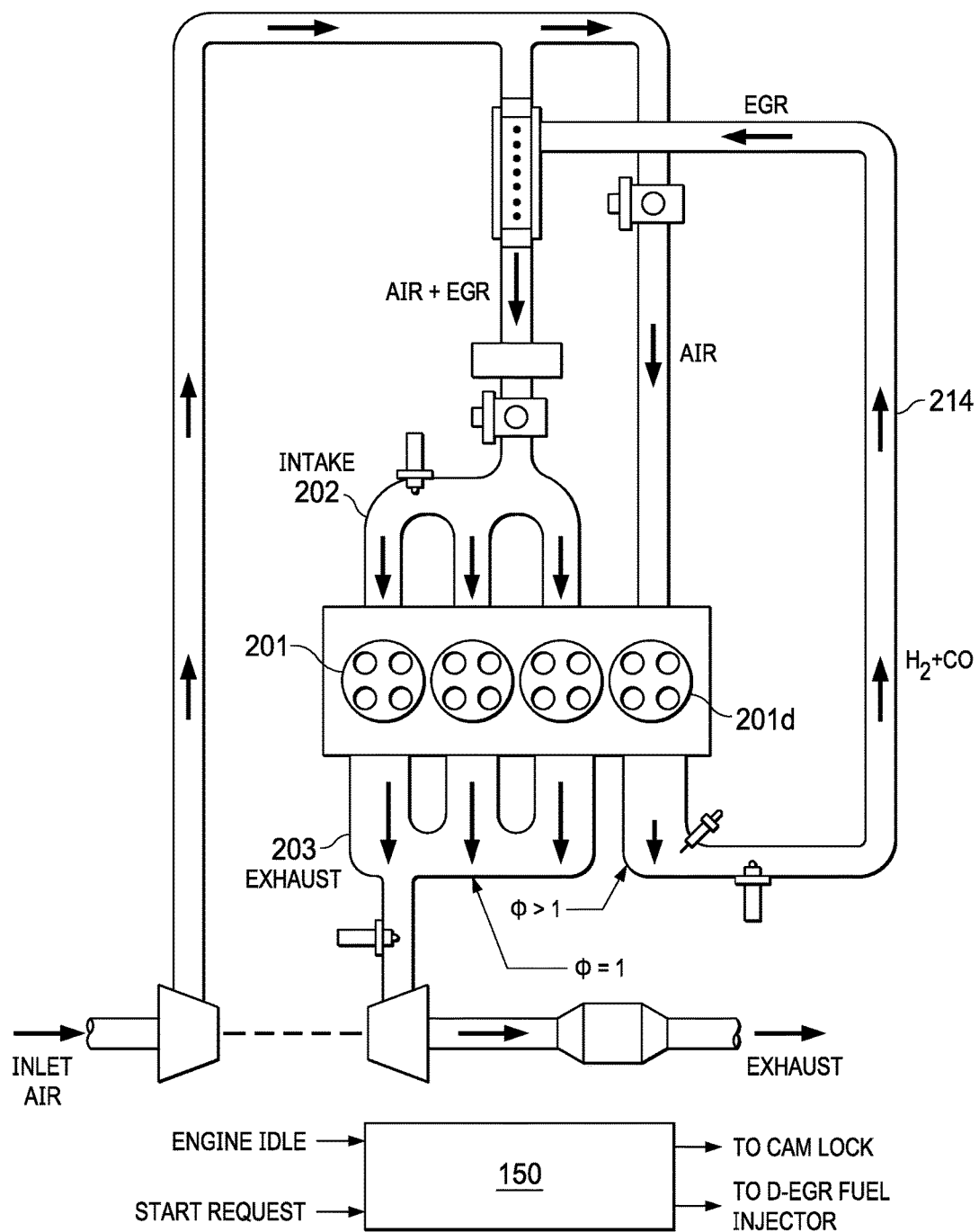
FIG. 2 illustrates a four-cylinder engine with one dedicated EGR cylinder, and a split intake manifold.

FIG. 2 illustrates a "split intake manifold" D-EGR engine 200. As illustrated, the main cylinders 201 share intake manifold 102, which mixes fresh air and EGR from EGR loop 214. Thus, only the main cylinders 201 receive exhaust gas from the D-EGR cylinder 201*d*. The D-EGR cylinder 201*d* does not receive EGR, but rather receives only fresh air.

D-EGR engine 200 does not have bypass valve 170 or bypass line 171, but is otherwise similar in structure and design to D-EGR engine 100.

Stopping the Engine

The start-stop methods described below are useful for both D-EGR engine 100 (shared intake manifold) and D-EGR engine 200 (split intake manifold). As explained below, the shared intake manifold engine 100 makes use of its bypass valve 170 and bypass line 171, which are not required for the split intake manifold engine 200. Furthermore, the stop methods described below may be used for any engine.

For purposes of this description, it is assumed that the engine has some sort of "start-stop" engine control system, which calls for the engine to be stopped at prescribed conditions in which no drive power is required and restarted when drive power is again required. In general, "start-stop" is used as an alternative to engine idling. The conditions at which a stop-start engine is stopped and restarted may vary according to a particular strategy, such as for improving fuel economy and minimizing undesired exhaust emissions.

For purposes of this description, direct start requires the engine to be stopped at a certain desired crankshaft angle position. In particular, the cylinder used for direct starting (referred to herein as the re-start cylinder) must be positioned at top dead center (TDC). The other cylinders will have pre-determined positions in relation to the re-start cylinder, due to the fact that in a conventional engine, all cylinders are connected via one solid crankshaft. As explained below, in the case of D-EGR engines, a D-EGR cylinder is the re-start cylinder.

For any engine, not limited to D-EGR engines, various techniques are possible for bringing the engine to a stop. As an alternative to various known techniques, the following description is directed to mechanical methods for stopping the engine.

One method for mechanically stopping the engine is to mechanically lock the camshaft or the crankshaft. A camshaft lock would allow for the position within the cycle to be easily guaranteed. A crankshaft lock could occur within either half of the engine cycle.

One problem presented by mechanically locking the camshaft or crankshaft is that a sudden stop could damage the engine. To prevent damage, a compliance device can be added to the engine. In the case of locking the crankshaft, a dual mass fly wheel could help reduce shock loading. In the case of locking the camshaft, a modified cam phaser type device can be used to cushion the stop.

Figure 3:
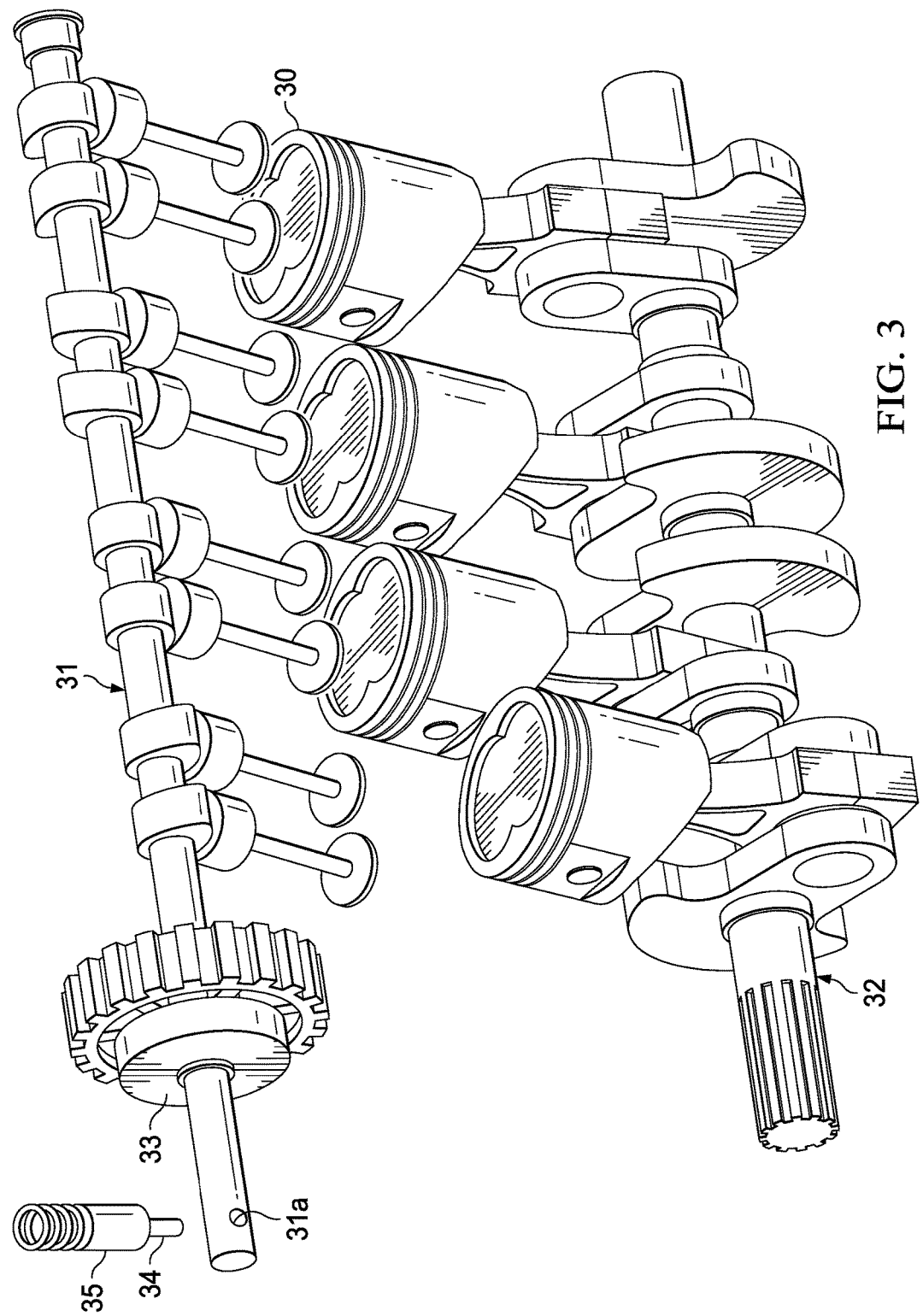
FIG. 3 illustrates a hydraulic cam phaser and cam shaft locking pin, used to stop the engine.

FIG. 3 illustrates an engine camshaft 31, and crankshaft 32, equipped for a stopping the re-start cylinder 30 (represented by its piston) at TDC.

The camshaft 31 is equipped with a hydraulic cam phaser 33, which may be used to lock the camshaft 31 with a pin 34 at a low RPM to guarantee that the engine stops at a desired position. Camshaft 31 has a small bore 31*a* for receiving the locking pin 34.

Lock pin 34 is actuated with a solenoid 35 to its locked position. The default position of pin 34 is its unlocked position.

Cam phaser 33 may be similar to today's conventional hydraulic cam phasers, which hydraulically advance or retard the cam. One modification to the conventional style cam phaser is to make it fully actuated so that when the camshaft 31 is locked, hydraulic pressure decelerates the engine to stop at a known position.

Locking the camshaft 31 will cause crankshaft 32 to decelerate and stop. The deceleration occurs over a range of cam angle degrees, such that the large inertia of the crankshaft, pistons, and flywheel is cushioned against a suddenly stop. An example of a suitable range of deceleration is 25-30 cam degrees.

On a conventional cam phaser, which is not designed to stop an engine, the valving does not allow for this type of cushioned operation. However, for purposes of stopping the engine, cam phaser 33 can be implemented with a "cushion" feature such as is used to cushion hydraulic cylinders. The hydraulic cylinder cushion can be accomplished with a restrictive orifice or a relief valve. A relief valve may be preferable because it would allow for passive control of the system.

Figure 4:
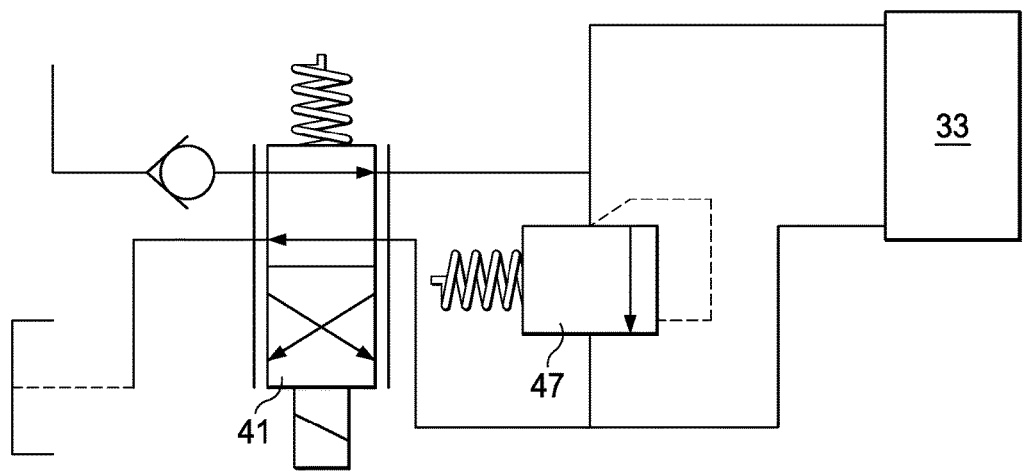
FIG. 4 schematically illustrates how the cam phaser may be cushioned with a relief valve.

FIG. 4 schematically illustrates cam phaser 33 with cushioning and an external cushioning relief valve 42. A cam phaser control valve 41 causes the camshaft 31 to stop, as described above, in response to a control signal from control unit 150. Alternatively, a cushioning relief valve could be incorporated into the control valve 41 or the cam phaser 33.

Relief valve 42 functions by limiting the maximum pressure that can be built up within the cam phaser 33 as it is forced to "retract" by the engine's inertia. The control valve 41 is in a neutral position during this operation. The maximum pressure would need to be above the system pressure, but it should be set to limit the maximum torque applied to the camshaft 31 from the crankshaft 32 while cushioning the engine system as it stops. Once the system reaches its neutral position with a locked camshaft, the engine position will be known. Relief valve 42 may be implemented in various ways known in the art of hydraulics.

Figure 5:
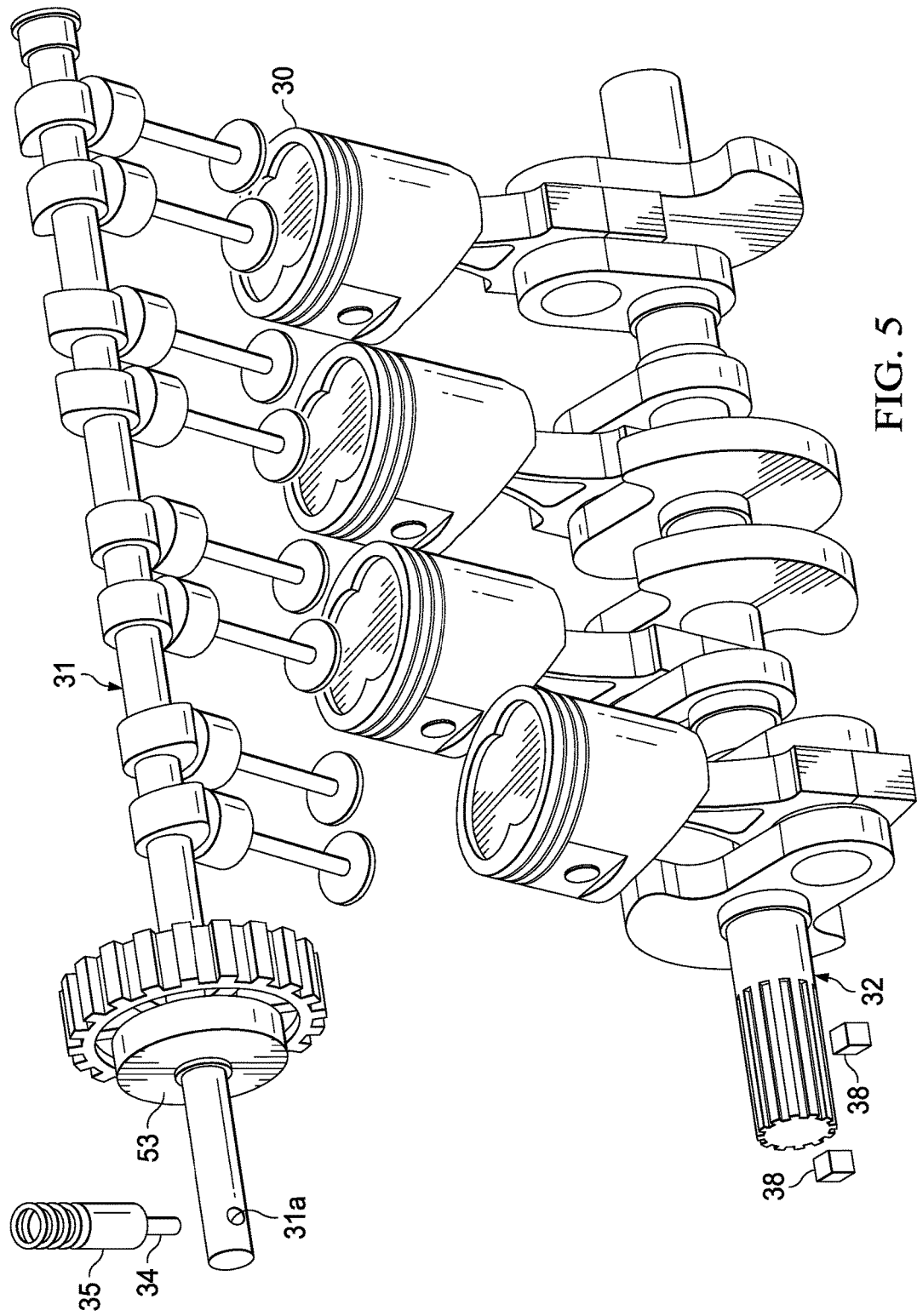
FIG. 5 illustrates an electronic cam phaser used to position the engine when stopped.

FIG. 5 illustrates another alternative for stopping the engine at a desired position, where cam phaser 53 is an electronic cam phaser. An electronic cam phaser uses an electric motor in conjunction with a planetary gear set to act as a phaser for the camshaft 31. If the engine is allowed to stop, the camshaft 31 could then be locked in a known position by rotating the camshaft with the cam phaser. Once the camshaft is locked, the cam phaser could then be used to rotate the crankshaft to the desired position.

An advantage of the electronic cam phaser 53 is that it could also be used to compress in-cylinder gasses with the engine off. After the engine has been off for a period of time, the gasses will bleed out of the cylinder. The engine could be stopped in a position that is not optimal for starting, but in a position that allows for later compression of the cylinder charge. Immediately before starting the engine, the engine could be repositioned to compress the cylinder charge. This could setup better initial conditions for more robustly starting the engine with lower emissions.

Furthermore, electronic cam phaser 53 can be used to completely flush potential residual gasses from the main or D-EGR cylinder(s) even when the engine is off by driving the crankshaft by means of the timing chain or belt or mechanical gear drive.

To reliably stop the engine, additional sensors are required for engine position tracking. The engine may not always turn in its operating direction while it is shutting down. Most engines use a single sensor on the crankshaft and one on the camshaft to find the position. However, because there is only a single sensor, a direction cannot be obtained.

Figure 6:
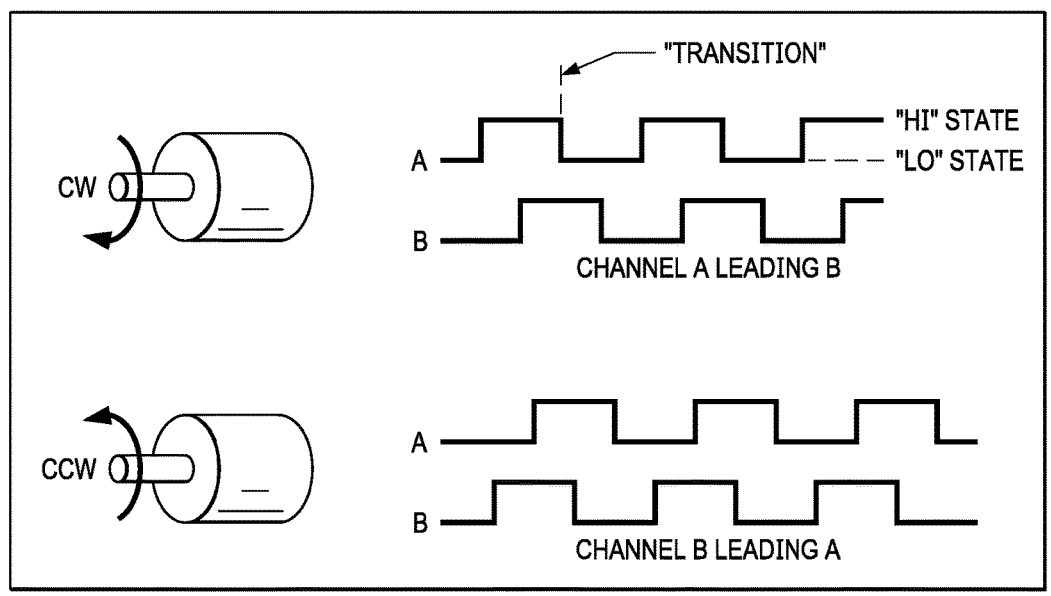
FIG. 6 a quadrature encoder for determining the direction in which the engine is turning while stopping.

FIG. 6 illustrates a quadrature encoder which generates two signals. By using one signal as a clock and the state of the other signal, a direction can be obtained. As illustrated, the output signals from the encoder change with direction.

Referring again to FIG. 5, output signals of the type illustrated in FIG. 6 are implemented with two crank angle sensors 38. Most engines use a 60-toothed gear that is missing two teeth to denote top dead center (TDC). The second sensor 38 is positioned relative to the first sensor 38 in terms of crank angle based on this gear (1.5, 7.5, 13.5 . . . CA°).

Re-Starting the Engine

As stated above, in the case of a D-EGR engine, a D-EGR cylinder is used for re-starting the engine. Emissions created during direct start are then re-burned in the main cylinders, reducing emissons.

A D-EGR engine having a shared intake manifold, such as the D-EGR engine of FIG. 1, has large levels of external EGR. The three-way valve 170 in the D-EGR cylinder exhaust runner may be opened to bleed-off EGR for the direct start intake. This is also true for regular engine operation below 2 bar BMEP, since combustion stability can be poor at very low engine loads. As a result, the D-EGR cylinder's EGR is bled-off when engine load decreases below 2 bar BMEP and thus not contain any external EGR during direct-start attempts.

Referring to FIG. 2, in case of a split-intake manifold D-EGR configuration, because the D-EGR cylinder does not receive its own exhaust, the total EGR concentration in the D-EGR cylinder(s) consists only of trapped residual gasses. The direct-start method is therefore even more suited for this engine configuration because no bleed-off is required.

Engine Control

Referring again to the D-EGR engines of FIGS. 1 and 2, control unit 150 has special programming to implement both the stop and start features of a start-stop engine. For non-D-EGR engines, a control unit operates in a similar manner.

For stopping the engine, such as when the engine is in idle, control unit 150 receives stop request data from the operation of the vehicle. It delivers control signals to the cam phaser 33 to bring the engine to a stop. It may further receive crank angle data from sensors 38 to ensure that the engine is stopped in the desired position.

For starting the engine, control unit 150 receives start request data, and delivers control signals to the fuel injector of the re-start cylinder. If the engine is a D-EGR engine, the re-start cylinder is D-EGR cylinder 201*d*. If exhaust bleed off is required, such as for the shared intake D-EGR engine of FIG. 1, control unit 150 is further programmed to deliver a control signal to valve 170.

What is claimed is:

1. A method of implementing start-stop in an internal combustion engine, the engine having exhaust gas recirculation (EGR) from at least one dedicated EGR (D-EGR) cylinder, with the other cylinders being main cylinders, comprising:

stopping all cylinders of the engine at an engine operating condition in which no drive power is required from the engine;

for only a D-EGR cylinder, performing the stopping step such that the piston is at a top dead center (TDC) position;

wherein the stopping step is performed by stopping the motion of the camshaft and using a cam phaser to lock the camshaft; and when engine drive power is again required, restarting the engine by directly injecting fuel into only the D-EGR cylinder.

2. The method of claim 1, wherein the cam phaser is a hydraulic cam phaser and stopping step is further performed by cushioning the stopping with the hydraulic cam phaser.

3. The method of claim 2, wherein the hydraulic cam phaser is equipped with a cushioning relief valve.

4. The method of claim 1, wherein the engine is a shared intake manifold engine, further having a bypass valve and bypass line, and further comprising the step of operating the bypass valve to divert a portion of the exhaust from the D-EGR cylinder(s) into the main exhaust line via the bypass line.

5. The method of claim 1, wherein the cam phaser is an electronic cam phaser, and wherein the stopping step is performed by allowing the engine to stop and moving the D-EGR cylinder to TDC, using the electronic cam phaser.

6. The method of claim 1, wherein the engine is a split intake manifold engine.

7. The method of claim 2, wherein the stopping step is performed over a range of less than 30 cam degrees.

8. The method of claim 2, wherein the hydraulic cam phaser is equipped with a restrictive orifice for cushioning the stopping of the engine.

9. The method of claim 5, further comprising using the electronic cam phaser to flush residual gases by driving the crankshaft.

* * * * *